Patented Feb. 24, 1953

2,629,755

UNITED STATES PATENT OFFICE 2,629,755

METHOD OF PLASTICIZING RUBBER

John Joseph Verbanc, Wilmington, Del., assignor to E. I. du Pont de Nemours & Company, Wilmington, Del., a corporation of Delaware No Drawing. Application October 17, 1947, Serial No. 780,589

11 Claims. (Cl. 260—761)

This invention relates to rubber and, more particularly, it relates to methods of treating rubber to produce a more plastic product.

It is well known that rubber when subjected to mechanical working in the presence of air or oxygen is rendered more plastic. The degree of plasticization is determined to a large extent by the time and temperature of milling. When milled for a sufficient length of time, rubber becomes very soft and, at the same time, will lose much of its ability to vulcanize. In order to reduce the time of milling and to prevent the deteriorating action of continued milling, it is common practice to add to the rubber, during the milling operation, certain materials which assist in producing a more plastic and workable product. The materials which are commonly used are oils, esters, waxes, fats, alcohols, acids, resins, and the like, which assist in the production of soft rubber either by a swelling action on the rubber or by acting as a lubricant. Some of the more common softeners are mineral oil, pine tar, palm oil, rosin oil, dibutyl phthalate, paraffin wax, glycerine, and stearic acid. Relatively large amounts of these agents must be used to produce the desired softness. The presence of these so-called "physical softeners" impairs a number of the physical properties of the resulting vulcanizates and for this reason their use is undesirable.

The use of substituted hydrazines and their salts as softeners for rubber has been disclosed in United States Patents 2,018,643, 2,018,644, and 2,018,645. The use of small amounts of this type of material permits rubber to be plasticized without the addition of harmful swelling agents such as oils, which continue to affect the physical properties of the rubber after vulcanization.

This invention has as an object to provide organic compositions, which when added in small amounts to rubber-like materials during processing, will not only materially decrease the time necessary for breakdown of the rubber, but will also greatly decrease the overall time necessary for the addition of compounding agents.

A further object of this invention is to provide organic chemicals which when added to rubber will increase the plasticity of the raw product sufficiently to produce better molding properties and superior extrusion characteristics.

Another object is to provide organic compositions which will act at relatively low temperatures, 100° C. to 175° C., making the design of new and costly equipment unnecessary.

Further, it is the object of this invention to provide organic compositions which when added to cements will materially decrease the viscosity, making possible the production of coating compositions of higher solids content.

An additional object is to provide a softener for rubber having an absence of or very slight odor and toxicity.

A further object is to provide a process for plasticizing rubber which will not lead to inferior properties in the resulting vulcanizates.

Further objects will appear hereinafter.

These objects may be accomplished in accordance with the present invention which comprises subjecting unvulcanized rubber to the action of 0.05% to 5.0% by weight based on the rubber of an acyl ester of an aromatic mercaptan for a sufficient length of time for the said acyl ester to effect a marked decrease in the resistance of the rubber to flow over that which the rubber would have if subjected to the same conditions in the absence of the said acyl ester. Preferably, the acyl ester of the aromatic mercaptan is one which is devoid of basic groups (i. e., substituted and unsubstituted amino groups), which would react with the aromatic mercapto constituent of the acyl ester.

The softening agents of this invention may be used as such, or may be diluted with non-reactive solvents without destroying the effectiveness of these agents. The degree of softening is dependent upon the amount of agent employed and the time and temperature of miling. The preferred temperature range is from 100° C. to 175° C., although both higher and lower temperatures may be used.

Acyl esters of aromatic mercaptans are broadly effective for the purposes of this invention. As representative, the following acyl ester groups are mentioned:

Acetyl, benzoyl, oxalyl, furoyl, fumaryl, phthalyl, succinyl, adipyl, methacrylyl, propionyl, butyryl, caproyl, o-chloro benzoyl, o-nitro benzoyl, monochloro acetyl, dichloro acetyl, and trichloro acetyl.

As representative are the following aromatic mercaptans from which the acyl esters are prepared:

Xylyl, 3-(carbo methoxy) phenyl, beta-naphthyl, o-tolyl and alpha-naphthyl mercaptans, chloro-thio phenol, nitro-thiophenol, mono- and di-thio resorcinol, 2-mercapto benzoic acid, 3-mercapto benzoic acid, 4-mercapto benzoic acid, mercapto anthracene, and mercapto anthraquinone. Esters of mixed thiols prepared by the treatment of commercial mixtures of aromatic hydrocarbons such as commercial xylene with sulfur chloride, followed by hydrogenation to the thiol, may also be used.

Other suitable acyl groups and aromatic mercaptans will be readily apparent to those skilled in the art.

As can be seen, the substituted as well as the unsubstituted compounds act in accordance with the present invention. It has been found, however, that the acyl aromatic mercaptans which are devoid of substituents which are basic in character (i. e., substituted and unsubstituted amino groups), which would otherwise react with the aromatic mercapto groups are preferable.

In order to more clearly illustrate the invention, the preferred modes of carrying the same into effect and the advantageous results to be obtained, the following examples are given:

EXAMPLE 1

Thirty (30) parts of smoked sheet rubber was placed on a small (2 x 6") rubber mill and masticated for one minute. The agent to be tested was then added in the quantity indicated in the following table and mixed with the rubber at the temperature and time indicated. The plasticized rubber so obtained was removed as a sheet and folded. Plasticity pellets were then cut from a sample of the plasticized polymer and the plasticity and recovery measured on a Williams' parallel plate plastometer [cf. Williams', Ind. Eng. Chem., 16, 362 (1924)]. Data obtained using several aromatic thiol esters as processing agents are recorded in Table I. Duplicate determinations are given under (1) and (2.)

Table I

WILLIAMS' PLASTICITY-RECOVERY MEASUREMENTS

| Plasticizing Agent | Milling Temp., °C. | Milling Time In Minutes | Percent Used | Plasticity | | Recovery | |
|---|---|---|---|---|---|---|---|
| | | | | (1) | (2) | (1) | (2) |
| None | 145 | 16 | None | 191 | 200 | 89 | 88 |
| Xylyl thiol acetate | 145 | 15 | 1.0 | 113 | 114 | 10 | 7 |
| Xylyl thiol methacrylate | 145 | 15 | 1.0 | 158 | 160 | 57 | 60 |
| 3-(Carbomethoxy) phenyl thiol acetate | 145 | 15 | 1.0 | 69 | 72 | 2 | 0 |
| beta-Naphthyl thiol acetate | 145 | 15 | 1.0 | 70 | 79 | 5 | 1 |

The information listed in Table I shows that esters of aromatic thiols are very strong softening agents for rubber. This softening effect is beneficial in that it (1) Materially decreases the power consumption of the mill or mixer employed to masticate and compound the polymer.

(2) Decreases the time required for the incorporation of compounding agents.

(3) Produces stocks which extrude and mold better.

(4) Makes possible the production of superior vulcanizates since the oils, tars, bitumins, etc., formerly employed as softening aids can be eliminated.

The softening effect produced by these compounds is completely destroyed on vulcanization so that the vulcanizate produced is superior to that obtained by the addition of "physical softeners" even though the degree of softening is greater prior to curing.

EXAMPLE 2

Employing the same technique as described in Example 1, a series of tests was made using a number of acyl esters of aromatic thiols as plasticizing agents for rubber. A number of concentrations of each agent were employed in order to show the outstanding softening effect produced by even extremely small amounts of these compounds. The data obtained are listed in Table II.

Table II

WILLIAMS' PLASTICITY-RECOVERY MEASUREMENTS

| Plasticizing Agent | Milling Temp., °C. | Milling Time In Minutes | Percent Used | Plasticity | | Recovery | |
|---|---|---|---|---|---|---|---|
| | | | | (1)[1] | (2) | (1) | (2) |
| None | 140-145 | 15 | None | 189 | 190 | 74 | 78 |
| o-Tolyl thiol acetate | 140-145 | 15 | 0.25 | 167 | 178 | 39 | 48 |
| Do | 140-145 | 15 | 0.50 | 166 | 176 | 44 | 49 |
| Do | 140-145 | 15 | 1.00 | 140 | 158 | 49 | 40 |
| Xylyl thiol trichloro acetate | 140-145 | 15 | 0.25 | 114 | 120 | 1 | 0 |
| Do | 140-145 | 15 | 0.50 | 91 | 99 | -2 | -9 |
| Do | 140-145 | 15 | 1.00 | 78 | 84 | -6 | -10 |
| beta-Naphthyl thiol acetate | 140-145 | 15 | 0.25 | 101 | 108 | -3 | -10 |
| Do | 140-145 | 15 | 0.50 | 90 | 98 | -3 | -11 |
| Do | 140-145 | 15 | 1.00 | 82 | 89 | -6 | -11 |
| alpha-Naphthyl thiol acetate | 140-145 | 15 | 0.25 | 84 | 84 | -4 | -4 |
| Do | 140-145 | 15 | 0.50 | 74 | 71 | -6 | -1 |
| Do | 140-145 | 15 | 1.00 | 70 | 76 | -5 | -10 |

[1] 1 and 2 represent duplicate tests.

EXAMPLE 3

Using the technique described in Example 1, a further series of tests was made using acyl esters of alpha-naphthyl thiol. The test data obtained in plasticizing rubber are recorded in Table III.

*Table III*

WILLIAMS' PLASTICITY-RECOVERY MEASUREMENTS

| Plasticizing Agent | Milling Temp., °C. | Milling Time In Minutes | Percent Used | Plasticity Recovery | | | |
|---|---|---|---|---|---|---|---|
| | | | | (1) | (2) | (1) | (2) |
| None | 145 | 15 | None | 188 | 197 | 91 | 85 |
| alpha-Naphthyl thiol Propionate | 145 | 15 | 0.25 | 105 | 108 | 4 | 3 |
| Do | 145 | 15 | 0.50 | 101 | 106 | 5 | 3 |
| Do | 145 | 15 | 1.00 | 74 | 78 | 1 | 0 |
| alpha-Naphthyl thiol methacrylate | 145 | 15 | 0.25 | 139 | 141 | 42 | 48 |
| Do | 145 | 15 | 0.50 | 107 | 109 | 5 | 5 |
| Do | 145 | 15 | 1.00 | 106 | 105 | 5 | 3 |

EXAMPLE 4

Thirty (30) parts of smoked sheet rubber was placed on a small (2 x 6") mill maintained at 150° C. and milled with the quantity of agent and for the period indicated in Table IV. Twenty (20) parts of the resultant plasticized polymer was mixed with 180 parts of xylene until a smooth cement was formed. The Stormer viscosity of the smooth cement was measured at 25° C. and found to be 10,800 seconds. Data obtained using a compound of this invention are recorded in Table IV.

*Table IV*

| Plasticizing Agent | Milling Temp., °C. | Milling Time in Minutes | Percent Agent Used | P[1] | R | V |
|---|---|---|---|---|---|---|
| None | 150 | 10 | None | 185 | 78 | 10,800 |
| alpha-Naphthyl thiol acetate | 150 | 10 | 0.25 | 98 | 2 | 219 |
| Do | 150 | 10 | 0.50 | 84 | 1 | 160 |
| Do | 150 | 10 | 1.00 | 69 | 0 | 61 |
| None | 150 | 15 | None | 179 | 76 | 6,300 |
| alpha-Naphthyl thiol acetate | 150 | 10 | 0.25 | 75 | 2 | 109 |
| Do | 150 | 10 | 0.50 | 74 | 0 | 78.5 |
| Do | 150 | 10 | 1.00 | 51 | 0 | 23.5 |

[1] P and R refer to the Williams' plasticity and recovery of the plasticized polymer. V represents the viscosity of a 10% xylene cement manufactured from softened polymer.

Rubber cements of increased rubber content and decreased viscosity may be prepared by dissolving the rubber in any suitable solvent such as benzene, gasoline, carbon tetrachloride, ethylene dichloride, and the like, and treating the solution with an acyl ester of an aromatic mercaptan or a mixture thereof. The ester will thereupon act greatly to reduce the viscosity of the cement as shown in Example 4. It will generally be preferable either to treat the rubber with the ester to develop a soft product before dissolving the rubber in the solvent or to add the ester to the solvent before dissolving the rubber therein. By these last two methods it will be found that solution of the rubber in the solvent will be greatly expedited and large amount of rubber may be incorporated in the solvent to produce a cement of specified viscosity.

As disclosed in U. S. Patent 2,064,580 the aromatic mercaptans themselves give excellent results as softening agent for rubber and these mercaptans have been utilized to great advantage in the industry. I have found, however, that the acyl esters of aromatic mercaptans of my invention have a somewhat more softening effect on a molecular basis and have the further advantage of having absence of or less odor and toxicity. The advantage of these latter improvements is apparent. This makes available softening agents which are more agreeable to handle and which eliminate health hazards inherent in toxic materials.

By the phrase "decreasing the resistance of the rubber to flow" I mean to include decrease in the viscosity of rubber solutions as well as increase in plasticity of ordinary unvulcanized rubber in a more or less solid state.

While I have disclosed the preferred embodiments of my invention it will be apparent to those skilled in the art that many changes and variations may be made therein without departing from the spirit of my invention. Accordingly, the scope of my invention is to be limited solely by the appended claims construed as broadly as is permissible in view of the prior art.

I claim as my invention:

1. The method of decreasing the resistance to flow of unvulcanized rubber comprising incorporating 0.05% to 5% by weight based on the unvulcanized rubber of an acyl ester of a naphthyl thiol devoid of amino substituents wherein the acyl group contains less than 9 carbon atoms.

2. The method of decreasing the resistance to flow of unvulcanized rubber comprising incorporating 0.05% to 5% by weight based on the unvulcanized rubber of a naphthyl thiol acetate devoid of amino substituents.

3. The method of decreasing the resistance to flow of unvulcanized rubber comprising incorporating 0.05% to 5% by weight based on the unvulcanized rubber of xylyl thiol acetate.

4. The method of decreasing the resistance to flow of unvulcanized rubber comprising incorporating 0.05% to 5% by weight based on the unvulcanized rubber of alphanaphthyl thiol acetate.

5. The method of decreasing the resistance to flow of unvulcanized rubber comprising incorporating 0.05% to 5% by weight based on the unvulcanized rubber of an acyl ester of an aromatic mercaptan which ester is devoid of amino substituents and in which the acyl group contains less than 9 carbon atoms and the aromatic group contains at most 3 benzene rings.

6. The method of decreasing the resistance to flow of unvulcanized rubber comprising incorporating 0.05% to 5% by weight based on the unvulcanized rubber of an acyl ester of an aromatic mercaptan which ester is devoid of amino substituents and in which the acyl group contains less than 9 carbon atoms and the aromatic mercaptan is a member of the group consisting of xylyl mercaptans, 3-(carbo methoxy) phenyl mercaptan, beta-naphthyl mercaptan, alpha-naphthyl mercaptan, o-tolyl mercaptan, chloro-thio phenol, nitro-thiophenol, mono-thio resorcinol, di-thio resorcinol, 2-mercapto benzoic acid, 3-mercapto benzoic acid, 4-mercapto benzoic acid, mercapto anthracene and mercapto anthraquinone.

7. The method of decreasing the resistance to flow of unvulcanized rubber comprising incorporating 0.05% to 5% by weight based on the unvulcanized rubber of an acyl ester of an aromatic mercaptan which ester is devoid of amino substituents and in which the acyl group contains less than 9 carbon atoms and the aromatic group contains from 1 to 2 benzene rings and consists of carbon and hydrogen.

8. Unvulcanized rubber containing 0.05% to 5% by weight based on the unvulcanized rubber of an acyl ester of an aromatic mercaptan which ester is devoid of amino substituents and in which the acyl group contains less than 9 carbon atoms and the aromatic group contains at most 3 benzene rings.

9. Unvulcanized rubber containing 0.05% to 5% by weight based on the unvulcanized rubber of an acyl ester of an aromatic mercaptan which ester is devoid of amino substituents and in which the acyl group contains less than 9 carbon atoms and the aromatic mercaptan is a member of the group consisting of xylyl mercaptans, 3-(carbo methoxy) phenyl mercaptan, beta-naphthyl mercaptan, alpha-naphthyl mercaptan, o-tolyl mercaptan, chloro-thio phenol, nitro-thiophenol, mono-thio resorcinol, di-thio resorcinol, 2-mercapto benzoic acid, 3-mercapto benzoic acid, 4-mercapto benzoic acid, mercapto anthracene and mercapto anthraquinone.

10. Unvulcanized rubber containing 0.05% to 5% by weight based on the unvulcanized rubber of an acyl ester of an aromatic mercaptan which ester is devoid of amino substituents and in which the acyl group contains less than 9 carbon atoms and the aromatic group contains from 1 to 2 benzene rings and consists of carbon and hydrogen.

11. The method of decreasing the resistance to flow of unvulcanized rubber comprising incorporating 0.05% to 5% by weight based on the unvulcanized rubber of an acetyl ester of an aromatic mercaptan devoid of amino substituents wherein the aromatic mercaptan is a member of the group consisting of xylyl mercaptans, 3-(carbo methoxy) phenyl mercaptan, beta-naphthyl mercaptan, alpha-naphthyl mercaptan, o-tolyl mercaptan, chloro-thio phenol, nitro-thiophenol, mono-thio resorcinol, di-thio resorcinol, 2-mercapto benzoic acid, 3-mercapto benzoic acid, 4-mercapto benzoic acid, mercapto anthracene and mercapto anthraquinone.

JOHN JOSEPH VERBANC.

REFERENCES CITED

The following references are of record in the file of this patent:

UNITED STATES PATENTS

| Number | Name | Date |
|---|---|---|
| 2,223,085 | Williams et al. | Nov. 26, 1940 |
| 2,445,142 | Himel | July 13, 1948 |